United States Patent [19]
Monte et al.

[11] Patent Number: 6,023,606
[45] Date of Patent: *Feb. 8, 2000

[54] METHOD FOR ACCOUNTING FOR USER TERMINAL CONNECTION TO A SATELLITE COMMUNICATIONS SYSTEM

[75] Inventors: Paul A. Monte, San Jose; Robert A. Wiedeman, Los Altos; Michael J. Sites, Fremont, all of Calif.

[73] Assignee: Globalstar L.P., San Jose, Calif.

[ * ] Notice: This patent is subject to a terminal disclaimer.

[21] Appl. No.: 08/819,048

[22] Filed: Mar. 17, 1997

Related U.S. Application Data

[63] Continuation of application No. 08/474,443, Jun. 7, 1995, Pat. No. 5,664,006.

[51] Int. Cl.$^7$ .................................................... H04B 7/185

[52] U.S. Cl. ........................ 455/13.1; 455/13.4; 455/405; 455/408; 455/427

[58] Field of Search .................................... 455/408, 430, 455/405, 427, 13.1, 13.4; 370/320

[56] References Cited

U.S. PATENT DOCUMENTS

| | | | |
|---|---|---|---|
| Re. 32,905 | 4/1989 | Baran | 370/104 |
| 4,901,307 | 2/1990 | Gilhousen et al. | 370/18 |
| 5,010,317 | 4/1991 | Schwendeman et al. | 340/311.1 |
| 5,073,900 | 12/1991 | Mallinckrodt | 375/1 |
| 5,081,703 | 1/1992 | Lee | 455/13 |

(List continued on next page.)

FOREIGN PATENT DOCUMENTS

| | | |
|---|---|---|
| 0 421 698 A3 | 10/1991 | European Pat. Off. . |
| 536921 | 4/1993 | European Pat. Off. . |
| WO 90/13186 | 11/1990 | WIPO . |
| WO 91/09473 | 6/1991 | WIPO . |

OTHER PUBLICATIONS

Southwestern Cellular Service, "Southwestern Bell Cellular Service System Description", pp. 13–14, 1985.

Carlson, "Celestri Seeks Ka–band Space", Wireless Week, Jun. 1997.

Davis, "New Wireless heights", Wireless Week, Mar. 1998.

Petition of American Mobile Satellite Corporation Before the FCC, Washington, DC 20554, dated Jun. 3, 1991, pp. 1–15.

Application of Motorola Satellite Communications, Inc. for IRIDIUM A Low Earth Orbit Mobile Satellite System before the FCC, Washington, D.C. Dec. 1990, pp. 49–96.

(List continued on next page.)

*Primary Examiner*—William Cumming
*Attorney, Agent, or Firm*—Ohlandt, Greeley Ruggiero & Perle, L.L.P.

[57] ABSTRACT

A method and system for accurately accounting for an amount of satellite communications system resources that are allotted to and utilized by a user terminal on a per call or connection basis. The method accumulates data at periodic intervals during a connection, the data indicating what portion of the overall system resources are utilized on both a forward link (gateway to satellite(s) to user terminal) and on a reverse link (user terminal to satellite(s) to gateway). The usage data can include power levels, data rates, user terminal location, and user terminal type. A Gateway (18) that is assigned to handling the call for the user terminal (13) accumulates the data and subsequently transfers the data over a terrestrial data network (39) to a Ground Operations Control Center (38). The center uses the data to determine an amount to be billed to a service provider associated with a service area that includes the gateway. The center may also uses this data to derive statistical information describing the communications traffic handled by the gateway, and to derive predicted resource allocation and resource scheduling information for the gateway.

38 Claims, 6 Drawing Sheets

U.S. PATENT DOCUMENTS

| | | | |
|---|---|---|---|
| 5,109,390 | 4/1992 | Gilhousen et al. | 375/1 |
| 5,115,514 | 5/1992 | Leslie | 455/9 |
| 5,119,225 | 6/1992 | Grant et al. | 359/172 |
| 5,216,427 | 6/1993 | Yan et al. | 342/352 |
| 5,233,626 | 8/1993 | Ames | 375/1 |
| 5,239,671 | 8/1993 | Linquist et al. | 455/13.1 |
| 5,303,286 | 4/1994 | Wiedeman | 379/59 |
| 5,339,330 | 8/1994 | Mallinckrodt | 375/1 |
| 5,410,728 | 4/1995 | Bertiger et al. | 455/13.1 |
| 5,415,368 | 5/1995 | Horstein et al. | 244/158 R |
| 5,422,647 | 6/1995 | Hirshfield et al. | 342/354 |
| 5,433,726 | 7/1995 | Horstein et al. | 244/158 R |
| 5,439,190 | 8/1995 | Horstein et al. | 244/158 |
| 5,446,756 | 8/1995 | Mallinckrodt | 375/200 |
| 5,448,621 | 9/1995 | Knudsen | 379/58 |
| 5,448,623 | 9/1995 | Wiedeman et al. | 379/59 |
| 5,483,575 | 1/1996 | Zdanowski et al. | 455/408 |
| 5,526,404 | 6/1996 | Wiedeman et al. | 455/430 |
| 5,555,257 | 9/1996 | Dent | 370/95.1 |
| 5,555,444 | 9/1996 | Diekelman et al. | 455/12.1 |
| 5,590,395 | 12/1996 | Diekelman | 455/13.1 |
| 5,594,780 | 1/1997 | Wiedeman et al. | 455/430 |
| 5,655,005 | 8/1997 | Wiedeman et al. | 370/320 |
| 5,664,006 | 9/1997 | Monte et al. | 455/405 |
| 5,715,297 | 2/1998 | Wiedeman | 455/427 |
| 5,787,336 | 7/1998 | Hirschfield et al. | 455/13.4 |
| 5,812,932 | 9/1998 | Wiedeman et al. | 455/13.1 |

OTHER PUBLICATIONS

Before the FCC, Washington, D.C. 20554, Aries Constellation Low Earth Orbit Satellite System Proposal of Constellation Communications, Inc. Jun. 3, 1991, Appendix A, B, and C.

Application of TRW Inc. for Authority to Construct a New Communications Satellite System Odyssey$^{SM}$ before the FCC, Washington, D.C. 20554, May 31, 1991 pp. 33–51.

Application of Ellipsat Corporation ELLIPSAT for the Authority to Construct ELLIPSO$^R$I An Elliptical Orbit Satellite System, before the FCC, Washington, D.C. 20554, Nov. 2, 1990, pp. 5–34.

"An Integrated Satellite–Cellular Land Mobile System for Europe", E. Del Re, University of Florence, Dept. of Electronics Engineering, italy, Sep. 21, 1989.

Current and Future Mobile Satellite Communication Systems, S. Kato et al., IEICE Transactions, vol. E 74, No. 8 Aug. 1991, pp. 2201–2210.

"Digital Network Oriented Mobile Radio Satellite System as an Integrated Part of The GSM Cellular Radio System in Europe", P. Dondl, Deutsch BUndespost/Fernmeldetechniches Zentralmt/Darmstadt, Fed. Rep. Germ. Sep. 21, 1989.

"The OmniTRACS$^R$ Mobile Satellite Communications and Positioning System", E. Tiedemann, Jr. et al., Vehicle Electronics in the 90's: Proceedings of the In'l. Congress on Transporation Electronics, Oct. 1990.

"Software Implementation of a PN Spread Spectrum Receiver to Accommodate Dynamics", C. Cahn et al., IEEE Trans. on Comm., vol. COM–25, No. 8, Aug. 1977.

"A Communication Technique for Multipath Channels", R. Price, Proceedings of the IR, Mar. 1958, pp. 555–570.

"Increased Capacity Using CDMA for Mobile Satellite Communication", K. Gilhousen et al., IEEE Journal on Selected Areas in Communications, vol. 8, No. 4, May 1990, pp. 503–514.

"The Iridium™$^1$ System—A Revolutionary Satellite Communications System Developed with Innovative Applications of Technology", D. Sterling et al., IEEE, MILCOM 1991, Nov. 4–7.

"Iridium: Key to Worldwide Cellular Communications", J. Foley, Telecommunications, Oct. 1991, pp. 23–28.

Application of Loral Cellular Systems, Corp., before the Federal Communications Commission, Washington, D.C. Jun. 3, 1991, pp. 94–187.

METHOD FOR ACCOUNTING FOR USER TERMINAL CONNECTION TO A SATELLITE COMMUNICATIONS SYSTEM

CROSS-REFERENCE TO A RELATED PATENT APPLICATION

This patent application is a continuation of U.S. patent application Ser. No. 08/474,443, filed Jun. 7, 1995, entitled "Method for Accounting for User Terminal Connection to a Satellite Communication System", by R. A. Wiedeman, P. A. Monte, and M. J Sites, now U.S. Pat. No. 5,664,006, issued on Sep. 2, 1997.

FIELD OF THE INVENTION

This invention relates generally to communications systems and, in particular, to satellite communications systems wherein a plurality of user terminals are in bi-directional wireless communication with a terrestrial communications network via a gateway and at least one satellite.

BACKGROUND OF THE INVENTION:

In conventional terrestrial cellular communication systems it is often the case that a user is billed at a predetermined rate on a per minute basis for the use of the system. However, in a satellite-based communication system this type of billing arrangement may not accurately reflect a correct billing amount. By example, a user who is uploading or downloading a large data file though a satellite at 9.6 kb/s will most likely consume more of the system resources (e.g., satellite power) than another user who is engaged in a voice communication at an average speech bit rate of less than 4 kb/sec. The result is that an inequitable billing arrangement may exist, whereby some users effectively subsidize the useage of the system by other users.

OBJECTS OF THE INVENTION

It is a first object of this invention to provide an accurate measure of system resources that are consumed by a user of a satellite communication system on a per call or connection basis.

It is a further object of this invention to provide an accurate measure of system resources that are consumed by a user on a per call or connection basis, and to employ a method for generating and using data that results from measurements that are made repeatedly during the connection.

SUMMARY OF THE INVENTION

The foregoing and other problems are overcome and the objects of the invention are realized by a method for accurately accounting for an amount of satellite communications system resources that are allotted to and utilized by a user terminal on a per call or connection basis. The method accumulates data at periodic intervals during a connection, such as the speech coder frame rate, the data indicating what portion of the overall system resources are utilized on both a forward link (gateway to satellite(s)) and on a reverse link (user terminal to satellite(s) to gateway). A Gateway (GW) that is assigned to handling the call for the user terminal (UT) accumulates the data and subsequently transfers the data over a terrestrial data network (TDN) to a terrestrial control center such as a Ground Operations Control Center (GOCC). The GOCC uses the data to determine an amount to be billed to a service provider associated with a service area that includes the GW. The GOCC may also use this data to derive statistical information describing the communications traffic handled by the GW, and to derive predicted resource allocation and resource scheduling information for the GW.

It should be noted that the teaching of this invention can be used in lieu of a Voice Equivalent Minute (VEM) approach, or can be used in conjunction with the VEM to modify same as necessary to accurately reflect the system resources used in making a call.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
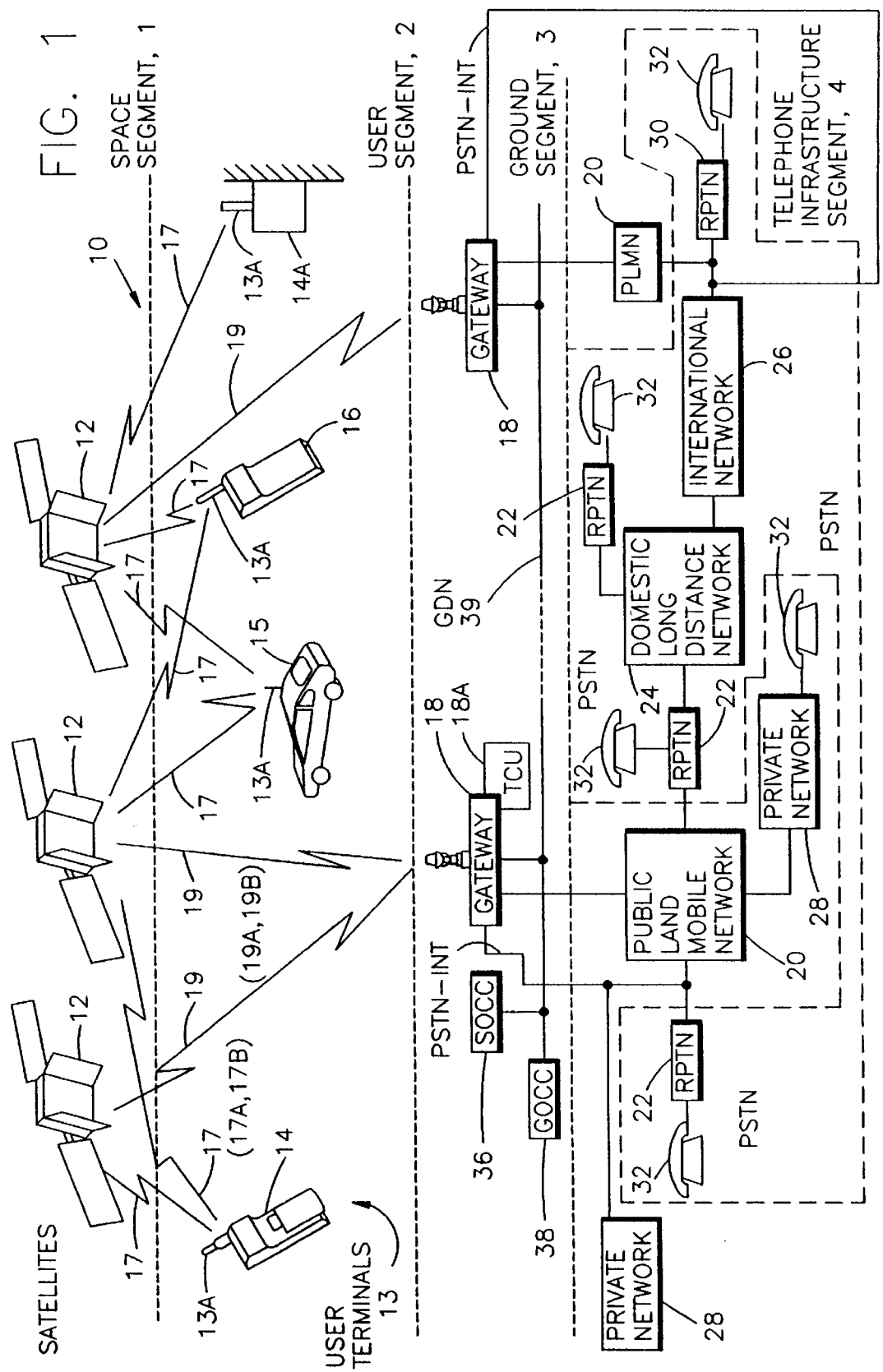
FIG. 1 is block diagram of a satellite communication system that is constructed and operated in accordance with a presently preferred embodiment of this invention.

FIG. 1 illustrates a presently preferred embodiment of a satellite communication system 10 that is suitable for use with the presently preferred embodiment of this invention. Before describing this invention in detail, a description will first be made of the communication system 10 so that a more complete understanding may be had of the present invention.

The communications system 10 may be conceptually sub-divided into a plurality of segments 1, 2, 3 and 4. Segment 1 is referred to herein as a space segment, segment 2 as a user segment, segment 3 as a ground (terrestrial) segment, and segment 4 as a telephone system infrastructure segment.

In the presently preferred embodiment of this invention there are a total of 48 satellites in, by example, a 1414 km Low Earth Orbit (LEO). The satellites 12 are distributed in eight orbital planes with six equally-spaced satellites per plane (Walker constellation). The orbital planes are inclined at 52 degrees with respect to the equator and each satellite completes an orbit once every 114 minutes. This approach provides approximately full-earth coverage with, preferably, at least two satellites in view at any given time from a particular user location between about 70 degree south latitude and about 70 degree north latitude. As such, a user is enabled to communicate to or from nearly any point on the earth's surface within a gateway (GW) 18 coverage area to or from other points on the earth's surface (by way of the PSTN), via one or more gateways 18 and one or more of the satellites 12, possibly also using a portion of the telephone infrastructure segment 4.

It is noted at this point that the foregoing and ensuing description of the system 10 represents but one suitable embodiment of a communication system within which the teaching of this invention may find use. That is, the specific details of the communication system are not to be read or construed in a limiting sense upon the practice of this invention.

Continuing now with a description of the system 10, a soft transfer (handoff) process between satellites 12, and also between individual ones of 16 spot beams transmitted by each satellite (FIG. 3B), provides unbroken communications via a spread spectrum (SS), code division multiple access (CDMA) technique. The presently preferred SS-CDMA technique is similar to the TIA/EIA Interim Standard, "Mobile Station-Base Station Compatibility Standard for Dual-Mode Wideband Spread Spectrum Cellular System" TIA/EIA/IS-95, July 1993, although other spread spectrum and CDMA techniques and protocols can be employed.

The low earth orbits permit low-powered fixed or mobile user terminals 13 to communicate via the satellites 12, each of which functions, in a presently preferred embodiment of this invention, solely as a "bent pipe" repeater to receive a communications traffic signal (such as speech and/or data) from a user terminal 13 or from a gateway 18, convert the received communications traffic signal to another frequency band, and to then re-transmit the converted signal. That is, no on-board signal processing of a received communications traffic signal occurs, and the satellite 12 does not become aware of any intelligence that a received or transmitted communications traffic signal may be conveying.

Furthermore, there need be no direct communication link or links between the satellites 12. That is, each of the satellites 12 receives a signal only from a transmitter located in the user segment 2 or from a transmitter located in the ground segment 3, and transmits a signal only to a receiver located in the user segment 2 or to a receiver located in the ground segment 3.

The user segment 2 may include a plurality of types of user terminals 13 that are adapted for communication with the satellites 12. The user terminals 13 include, by example, a plurality of different types of fixed and mobile user terminals including, but not limited to, handheld mobile radio-telephones 14, vehicle mounted mobile radio-telephones 15, paging/messaging-type devices 16, and fixed radio-telephones 14a. The user terminals 13 are preferably provided with omnidirectional antennas 3a for bidirectional communication via one or more of the satellites 12.

It is noted that the fixed radio-telephones 14a may employ a directional antenna. This is advantageous in that it enables a reduction in interference with a consequent increase in the number of users that can be simultaneously serviced with one or more of the satellites 12.

It is further noted that the user terminals 13 may be dual use devices that include circuitry for also communicating in a conventional manner with a terrestrial cellular system.

Figure 3A:
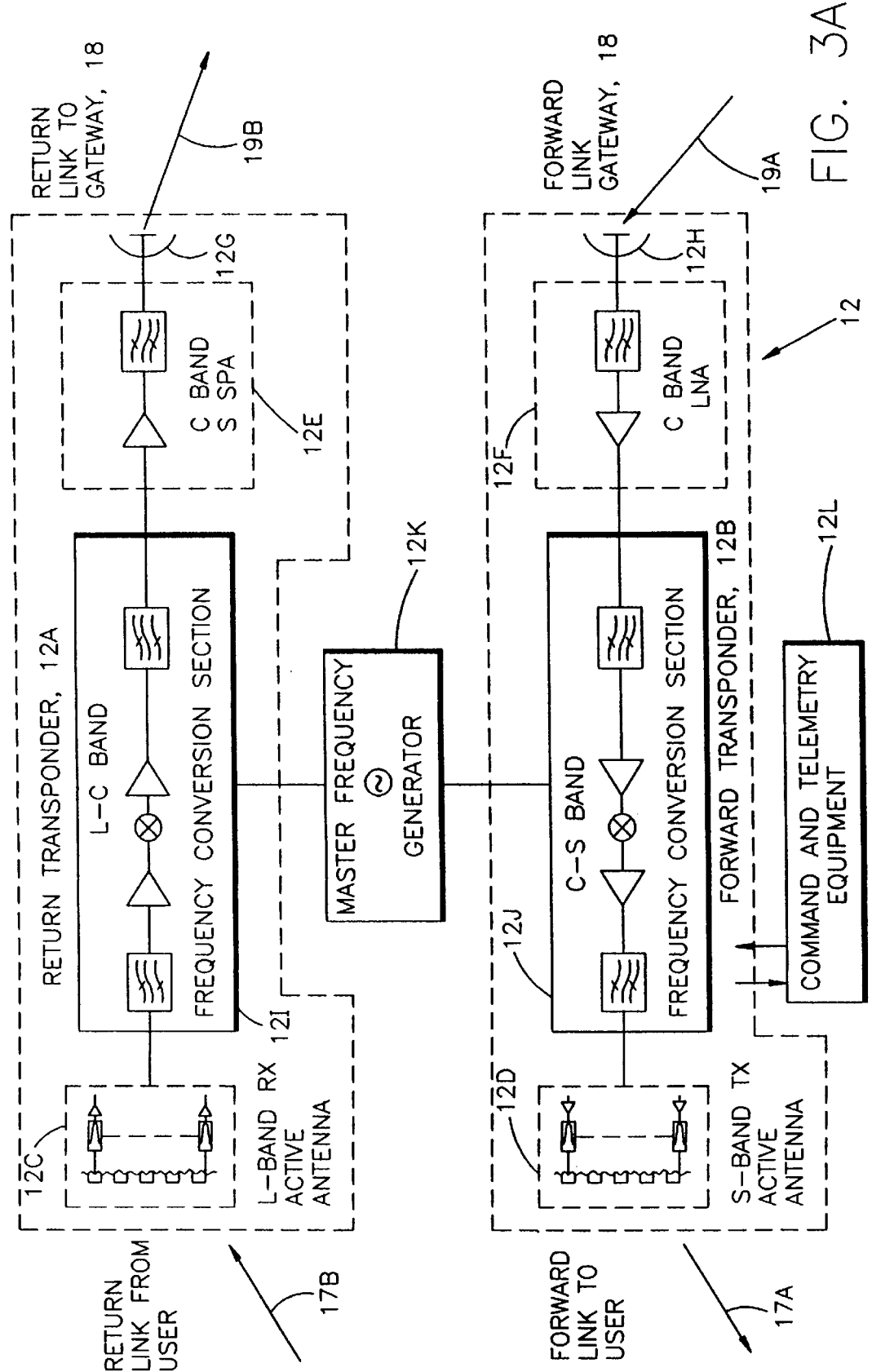
FIG. 3A is a block diagram of the communications payload of one of the satellites of FIG. 1.

Referring also to FIG. 3A, the user terminals 13 may be capable of operating in a full duplex mode and communicate via, by example, L-band RF links (uplink or return link 17b) and S-band RF links (downlink or forward link 17a) through return and forward satellite transponders 12a and 12b, respectively. The return L band RF links 17b may operate within a frequency range of 1.61 GHz to 1.625 GHz, a bandwidth of 16.5 MHz, and are modulated with packetized digital voice signals and/or data signals in accordance with the preferred spread spectrum technique. The forward S band RF links 17a may operate within a frequency range of 2.485 GHz to 2.5 GHz, a bandwidth of 16.5 MHz. The forward RF links 17a are also modulated at a gateway 18 with packetized digital voice signals and/or data signals in accordance with the spread spectrum technique.

The 16.5 MHz bandwidth of the forward link is partitioned into 13 channels with up to, by example, 128 users being assigned per channel. The return link may have various bandwidths, and a given user terminal 13 may or may not be assigned a different channel than the channel assigned on the forward link. However, when operating in the diversity reception mode on the return link (receiving from two or more satellites 12), the user is assigned the same forward and return link RF channel for each of the satellites.

The ground segment 3 includes at least one but generally a plurality of the gateways 18 that communicate with the satellites 12 via, by example, a full duplex C band RF link 19 (forward link 19a (to the satellite), return link 19b (from the satellite)) that operates within a range of frequencies generally above 3 GHz and preferably in the C-band. The C-band RF links bi-directionally convey the communication feeder links, and also convey satellite commands to the satellites and telemetry information from the satellites. The forward feeder link 19a may operate in the band of 5 GHz to 5.25 GHz, while the return feeder link 19b may operate in the band of 6.875 GHz to 7.075 GHz.

The satellite feeder link antennas 12g and 12h are preferably wide coverage antennas that subtend a maximum earth coverage area as seen from the LEO satellite 12. In the presently preferred embodiment of the communication.

The gateways 18 function to couple the communications payload or transponders 12a and 12b (FIG. 3A) of the satellites 12 to the telephone infrastructure segment 4. The transponders 12a and 12b include an L-band receive antenna 12c, S-band transmit antenna 12d, C-band power amplifier 12e, C-band low noise amplifier 12f, C-band antennas 12g and 12h, L band to C band frequency conversion section 12i, and C band to S band frequency conversion section 12j. The satellite 12 also includes a master frequency generator 12k and command and telemetry equipment 12l.

Reference in this regard may also be had to U.S. Pat. No. 5,422,647, issued Jun. 6, 1995, by E. Hirshfield and C. A. Tsao, entitled "Mobile Communications Satellite Payload".

The telephone infrastructure segment 4 is comprised of existing telephone systems and includes Public Land Mobile Network (PLMN) gateways 20, local telephone exchanges such as regional public telephone networks (RPTN) 22 or other local telephone service providers, domestic long distance networks 24, international networks 26, private networks 28 and other RPTNs 30. The communication system 10 operates to provide bidirectional voice and/or data communication between the user segment 2 and Public Switched Telephone Network (PSTN) telephones 32 and non-PSTN telephones 32 of the telephone infrastructure segment 4, or other user terminals of various types, which may be private networks.

Also shown in FIG. 1 (and also in FIG. 4), as a portion of the ground segment 3, is a Satellite Operations Control Center (SOCC) 36, and a Ground Operations Control Center (GOCC) 38. A communication path, which includes a Ground Data Network (GDN) 39 (see FIG. 2), is provided for interconnecting the gateways 18 and TCUs 18a, SOCC 36 and GOCC 38 of the ground segment 3. This portion of the system 10 the angle subtended from a given LEO satellite 12 (assuming 10° elevation angles from the earth's surface) is approximately 108°. This yields a coverage zone that is approximately 3500 miles in diameter.

Figure 3B:
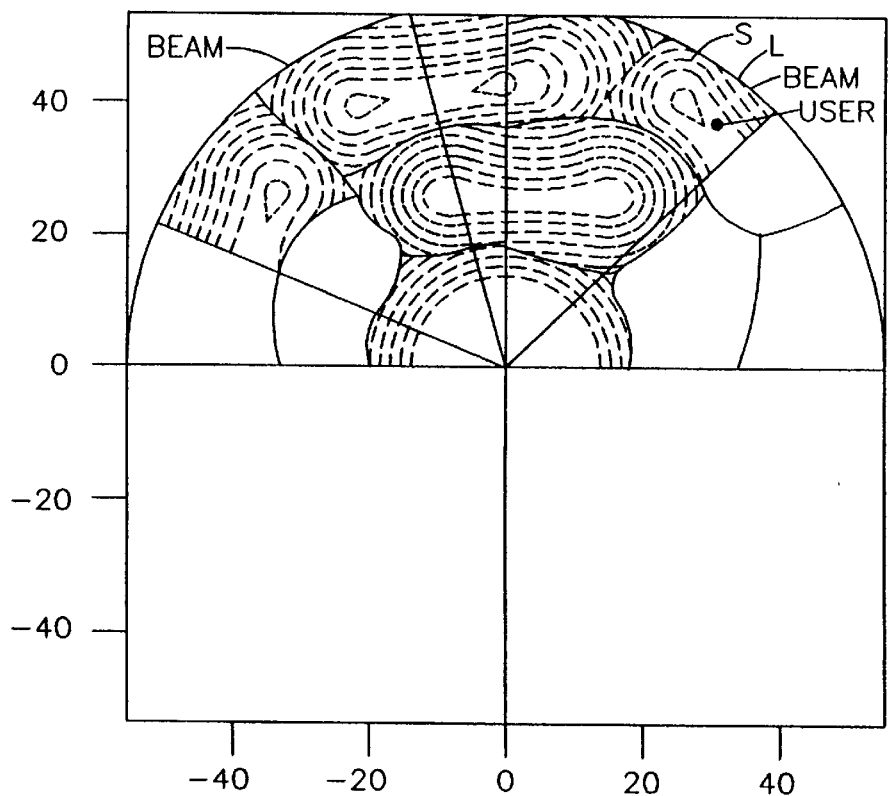
FIG. 3B illustrates a portion of a beam pattern that is associated with one of the satellites of FIG. 1.

The L-band and the S-band antennas are multiple beam antennas that provide coverage within an associated terrestrial service region. The L-band and S-band antennas 12d and 12c, respectively, are preferably congruent with one another, as depicted in FIG. 3B. That is, the transmit and receive beams from the spacecraft cover the same area on the earth's surface, although this feature is not critical to the operation of the system 10.

As an example, several thousand full duplex communications may occur through a given one of the satellites 12. In accordance with a feature of the system 10, two or more satellites 12 may each convey the same communication between a given user terminal 13 and one of the gateways 18. This mode of operation, as described in detail below, thus provides for diversity combining at the respective receivers, leading to an increased resistance to fading and facilitating the implementation of a soft handoff procedure.

It is pointed out that all of the frequencies, bandwidths and the like that are described herein are representative of but one particular system. Other frequencies and bands of frequencies may be used with no change in the principles being discussed. As but one example, the feeder links between the gateways and the satellites may use frequencies in a band other than the C-band (approximately 3 GHz to approximately 7 GHz), for example the Ku band (approximately 10 GHz to approximately 15 GHz) or the Ka band (above approximately 15 GHz).

Communications system 10 provides overall system control functions.

Figure 2:
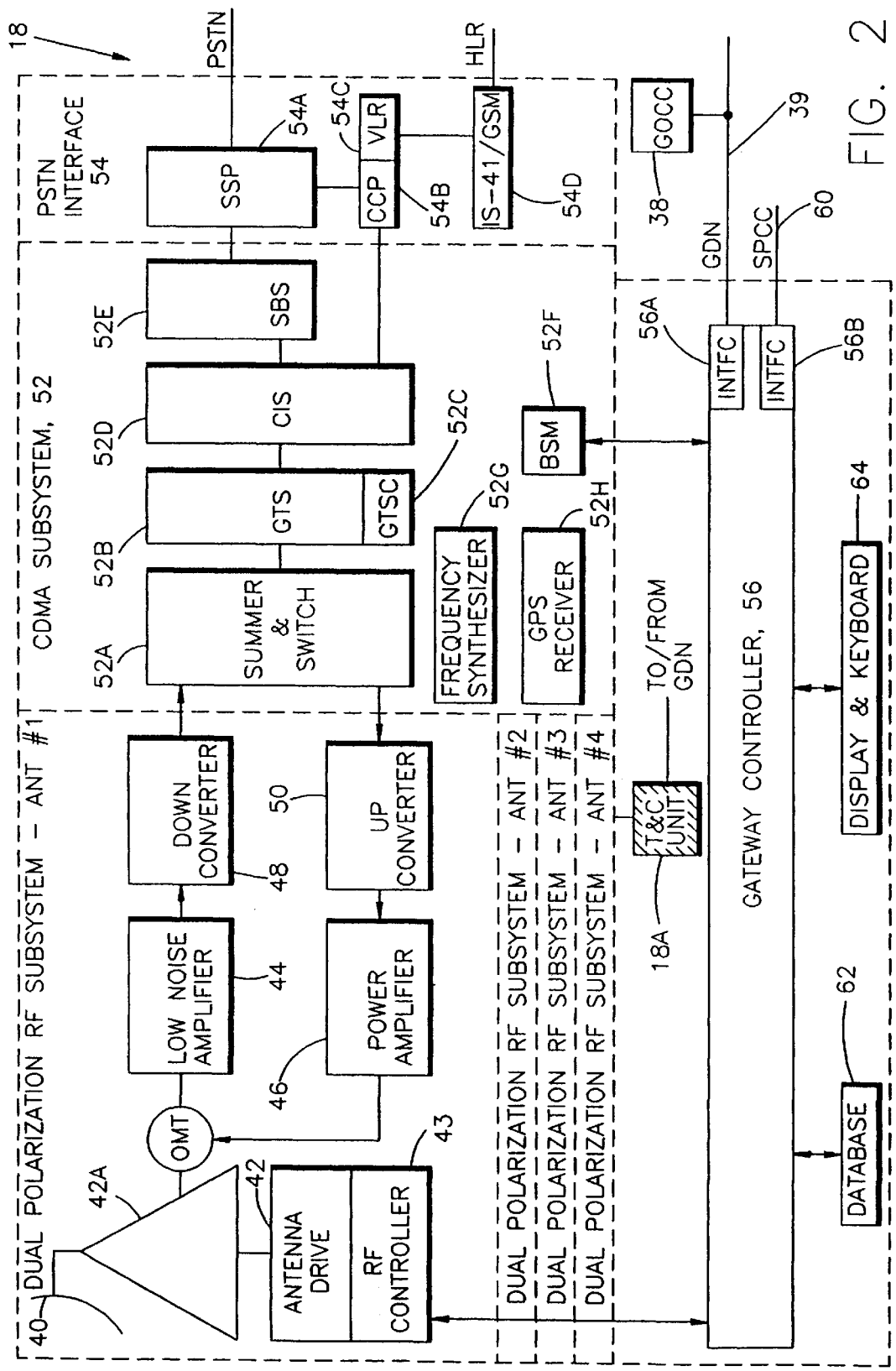
FIG. 2 is a block diagram of one of the gateways of FIG. 1.

FIG. 2 shows one of the gateways 18 in greater detail. Each gateway 18 includes up to four dual polarization RF C-band sub-systems each comprising a parabolic antenna 40, antenna driver 42 and pedestal 42a, low noise receivers 44, and high power amplifiers 46. All of these components may be located within a radome structure to provide environmental protection.

The gateway 18 further includes down converters 48 and up converters 50 for processing the received and transmitted RF carrier signals, respectively. The down converters 48 and the up converters 50 are connected to a CDMA sub-system 52 which, in turn, is coupled to the Public Switched Telephone Network (PSTN) though a PSTN interface 54. As an option, the PSTN could be bypassed by using satellite-to-satellite links.

The CDMA sub-system 52 includes a signal summer/switch unit 52a, a Gateway Transceiver Subsystem (GTS) 52b, a GTS Controller 52c, a CDMA Interconnect Subsystem (CIS) 52d, and a Selector Bank Subsystem (SBS) 52e. The CDMA sub-system 52 is controlled by a Base Station Manager (BSM) 52f and functions in a manner similar to a CDMA-compatible (for example, an IS-95 compatible) base station. The CDMA sub-system 52 also includes the required frequency synthesizer 52g and a Global Positioning System (GPS) receiver 52h.

The PSTN interface 54 includes a PSTN Service Switch Point (SSP) 54a, a Call Control Processor (CCP) 54b, a Visitor Location Register (VLR) 54c, and a protocol interface 54d to a Home Location Register (HLR). The HLR may be located in the cellular gateway 20 (FIG. 1) or, optionally, in the PSTN interface 54.

The gateway 18 is connected to telecommunication networks through a standard interface made through the SSP 54a. The gateway 18 provides an interface, and connects to the PSTN via Primary Rate Interface (PRI). The gateway 18 is further capable of providing a direct connection to a Mobile Switching Center (MSC).

The gateway 18 provides SS-7 ISDN fixed signalling to the CCP 54b. On the gateway-side of this interface, the CCP 54b interfaces with the CIS 52d and hence to the CDMA sub-system 52. The CCP 54b provides protocol translation functions for the system Air Interface (AI), which may be similar to the IS-95 Interim Standard for CDMA communications.

Blocks 54c and 54d generally provide an interface between the gateway 18 and an external cellular telephone network that is compatible, for example, with the IS-41 (North American Standard, AMPS) or the GSM (European Standard, MAP) cellular systems and, in particular, to the specified methods for handling roamers, that is, users who place calls outside of their home system. The gateway 18 supports user terminal authentication for system 10/AMPS phones and for system 10/GSM phones. In service areas where there is no existing telecommunications infrastructure, an HLR can be added to the gateway 18 and interfaced with the SS-7 signalling interface.

A user making a call out of the user's normal service area (a roamer) is accommodated by the system 10 if authorized. In that a roamer may be found in any environment, a user may employ the same terminal equipment to make a call from anywhere in the world, and the necessary protocol conversions are made transparently by the gateway 18. The protocol interface 54d is bypassed when not required to convert, by example, GSM to AMPS.

It is within the scope of the teaching of this invention to provide a dedicated, universal interface to the cellular gateways 20, in addition to or in place of the conventional "A" interface specified for GSM mobile switching centers and vendor-proprietary interfaces to IS-41 mobile switching centers. It is further within the scope of this invention to provide an interface directly to the PSTN, as indicated in FIG. 1 as the signal path designated PSTN-INT.

Overall gateway control is provided by the gateway controller 56 which includes an interface 56a to the above-mentioned Ground Data Network (GDN) 39 and an interface 56b to a Service Provider Control Center (SPCC) 60. The gateway controller 56 is generally interconnected to the gateway 18 through the BSM 52f and through RF controllers 43 associated with each of the antennas 40. The gateway controller 56 is further coupled to a database 62, such as a database of users, satellite ephemeris data, etc., and to an I/O unit 64 that enables service personnel to gain access to the gateway controller 56. The GDN 39 is also bidirectionally interfaced to a Telemetry and Command (T&C) unit 66 (FIGS. 1 and 4).

Figure 4:
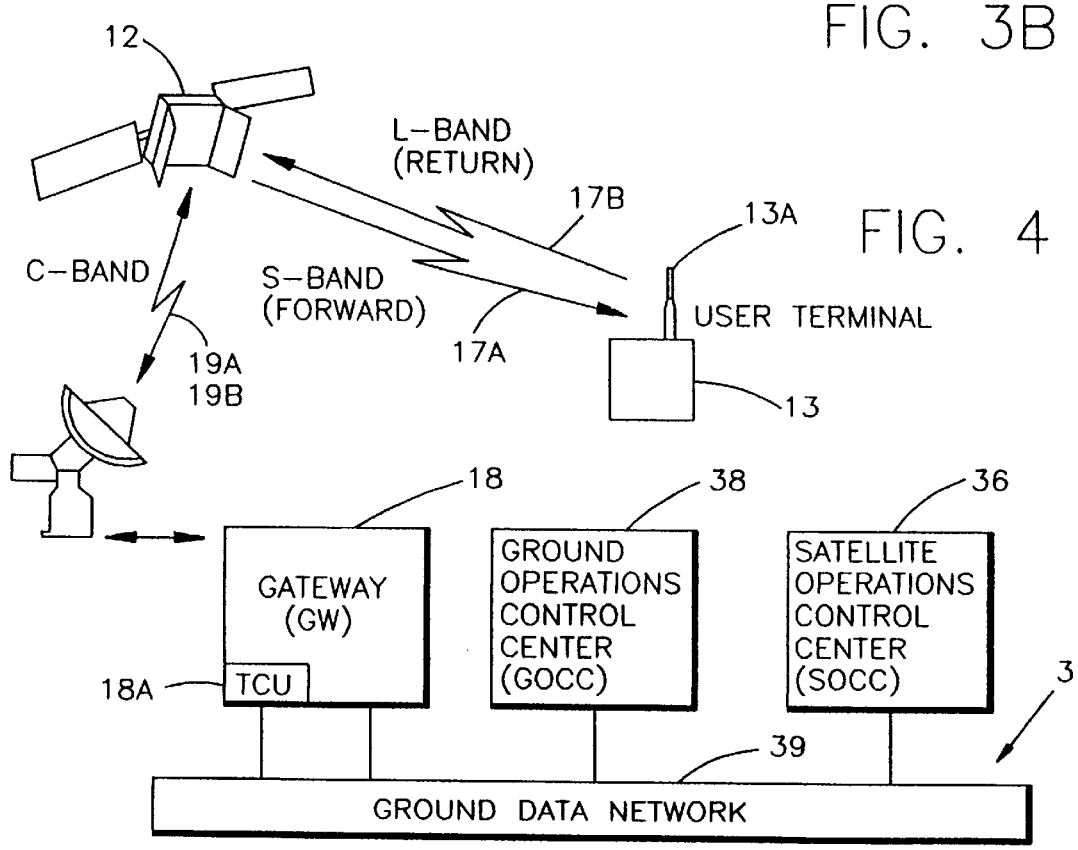
FIG. 4 is a block diagram that depicts the ground equipment support of satellite telemetry and control functions.

Referring to FIG. 4, the function of the GOCC 38 is to plan and control satellite utilization by the gateways 18, and to coordinate this utilization with the SOCC 36. In general, the GOCC 38 analyses trends, generates traffic plans, allocates satellite 12 and system resources (such as, but not limited to, power and channel allocations), monitors the performance of the overall system 10, and issues utilization instructions, via the GDN 39, to the gateways 18 in real time or in advance.

The SOCC 36 operates to maintain and monitor orbits, to relay satellite usage information to the gateway for input to the GOCC 38 via the GDN 39, to monitor the overall functioning of each satellite 12, including the state of the satellite batteries, to set the gain for the RF signal paths within the satellite 12, to ensure optimum satellite orientation with respect to the surface of the earth, in addition to other functions.

As described above, each gateway 18 functions to connect a given user to the PSTN for both signalling, voice and/or data communications and also to generate data, via database 62 (FIG. 2), for billing purposes. Selected gateways 18 include a Telemetry and Command Unit (TCU) 18a for receiving telemetry data that is transmitted by the satellites 12 over the return link 19b and for transmitting commands up to the satellites 12 via the forward link 19a. The GDN 39 operates to interconnect the gateways 18, GOCC 38 and the SOCC 36.

In general, each satellite 12 of the LEO constellation operates to relay information from the gateways 18 to the users (C band forward link 19a to S band forward link 17a), and to relay information from the users to the gateways 18 (L band return link 17b to C band return link 19b). This information includes SS-CDMA synchronization and paging channels, in addition to power control signals. Various CDMA pilot channels may also be used to monitor interference on the forward link. Satellite ephemeris update data is also communicated to each of the user terminals 13, from the gateway 18, via the satellites 12. The satellites 12 also function to relay signalling information from the user terminals 13 to the gateway 18, including access requests, power change requests, and registration requests. The satellites 12 also relay communication signals between the users and the gateways 18, and may apply security to mitigate unauthorized use.

In operation, the satellites 12 transmit spacecraft telemetry data that includes measurements of satellite operational status. The telemetry stream from the satellites, the commands from the SOCC 36, and the communications feeder links 19 all share the C band antennas 12g and 12h. For those gateways 18 that include a TCU 18a the received satellite telemetry data may be forwarded immediately to the SOCC 36, or the telemetry data may be stored and subsequently forwarded to the SOCC 36 at a later time, typically upon SOCC request. The telemetry data, whether transmitted immediately or stored and subsequently forwarded, is sent over the GDN 39 as packet messages, each packet message containing a single minor telemetry frame. Should more than one SOCC 36 be providing satellite support, the telemetry data is routed to all of the SOCCs.

The SOCC 36 has several interface functions with the GOCC 38. One interface function is orbit position information, wherein the SOCC 36 provides orbital information to the GOCC 38 such that each gateway 18 can accurately track up to four satellites that may be in view of the gateway. This data includes data tables that are sufficient to allow the gateways 18 to develop their own satellite contact lists, using known algorithms. The SOCC 36 is not required to known the gateway tracking schedules. The TCU 18a searches the downlink telemetry band and uniquely identifies the satellite being tracked by each antenna prior to the propagation of commands.

Another interface function is satellite status information that is reported from the SOCC 36 to the GOCC 38. The satellite status information includes both satellite/transponder availability, battery status and orbital information and incorporates, in general, any satellite-related limitations that would preclude the use of all or a portion of a satellite 12 for communications purposes.

An important aspect of the system 10 is the use of SS-CDMA in conjunction with diversity combining at the gateway receivers and at the user terminal receivers. Diversity combining is employed to mitigate the effects of fading as signals arrive at the user terminals 13 or the gateway 18 from multiple satellites over multiple and different path lengths. Rake receivers in the user terminals 13 and the gateways 18 are employed to receive and combine the signals from multiple sources. As an example, a user terminal 13 or the gateway 18 provides diversity combining for the forward link signals or the return link signals that are simultaneously received from and transmitted through the multiple beams of the satellites 12.

In this regard the disclosure of U.S. Pat. No. 5,233,626, issued Aug. 3, 1993 to Stephen A. Ames and entitled "Repeater Diversity Spread Spectrum Communication System", is incorporated by reference herein in its entirety.

The performance in the continuous diversity reception mode is superior to that of receiving one signal through one satellite repeater, and furthermore there is no break in communications should one link be lost due to shadowing or blockage from trees or other obstructions that have an adverse impact on the received signal.

The multiple, directional, antennas 40 of a given one of the gateways 18 are capable of transmitting the forward link signal (gateway to user terminal) through different beams of one or more satellites 12 to support diversity combining in the user terminals 13. The omnidirectional antennas 13a of the user terminals 13 transmit through all satellite beams that can be "seen" from the user terminal 13.

Each gateway 18 supports a transmitter power control function to address slow fades, and also supports block interleaving to address medium to fast fades. Power control is implemented on both the forward and reverse links. The response time of the power control function is adjusted to accommodate for a worst case 30 msec satellite round trip delay.

The block interleavers (53d, 53e, 53f, FIG. 5) operate over a block length that is related to vocoder 53g packet frames. An optimum interleaver length trades off a longer length, and hence improved error correction, at the expense of increasing the overall end-to-end delay. A preferred maximum end-to-end delay is 150 msec or less. This delay includes all delays including those due to the received signal alignment performed by the diversity combiners, vocoder 53g processing delays, block interleaver 53d–53f delays, and the delays of the Viterbi decoders (not shown) that form a portion of the CDMA sub-system 52.

Figure 5:
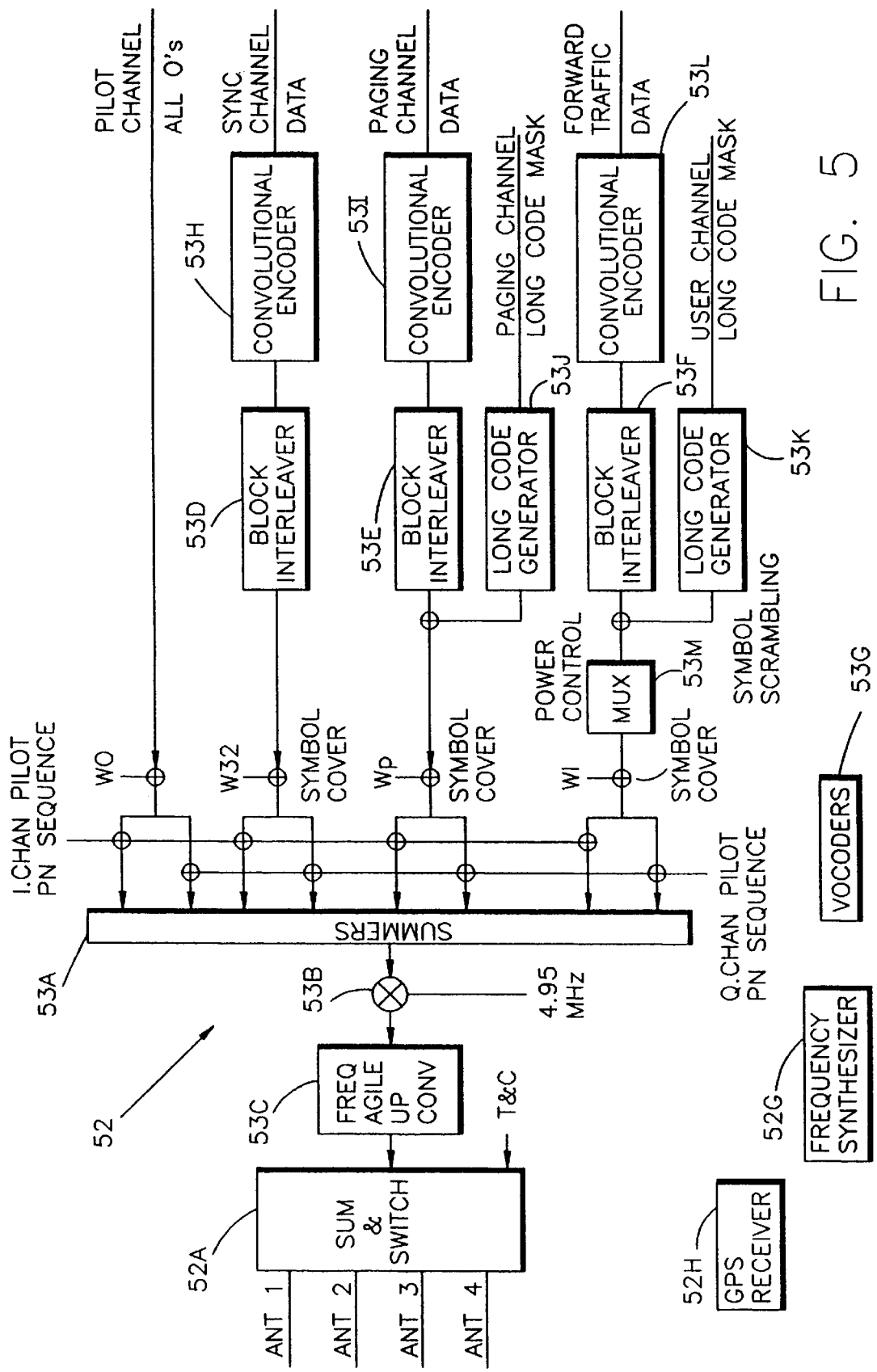
FIG. 5 is block diagram of the CDMA sub-system of FIG. 2.

FIG. 5 is a block diagram of the forward link modulation portion of the CDMA sub-system 52 of FIG. 2. An output of a summer block 53a feeds a frequency agile up-converter 53b which in turn feeds the summer and switch block 52a. The telemetry and control (T&C) information is also input to the block 52a.

An unmodulated direct sequence SS pilot channel generates an all zeros Walsh Code at a desired bit rate. This data stream is combined with a short PN code that is used to separate signals from different gateways 18 and different satellites 12. If used, the pilot channel is modulo 2 added to the short code and is then QPSK or BPSK spread across the CDMA RF channel bandwidth. The following different pseudonoise (PN) code offsets are provided: (a) a PN code offset to allow a user terminal 13 to uniquely identify a gateway 18; (b) a PN code offset to allow the user terminal 13 to uniquely identify a satellite 12; and (c) a PN code offset to allow the user terminal 13 to uniquely identify a given one of the 16 beams that is transmitted from the satellite 12. Pilot PN codes from different ones of the satellites 12 are assigned different time/phase offsets from the same pilot seed PN code.

If used, each pilot channel that is transmitted by the gateway 18 may be transmitted at a higher or lower power level than the other signals. A pilot channel enables a user terminal 13 to acquire the timing of the forward CDMA channel, provides a phase reference for coherent demodulation, and provides a mechanism to perform signal strength comparisons to determine when to initiate handoff. The use of the pilot channel is not, however, mandatory, and other techniques can be employed for this purpose.

The Sync channel generates a data stream that includes the following information: (a) time of day; (b) transmitting gateway identification; (c) satellite ephemeris; and (d) assigned paging channel. The Sync data is applied to a convolution encoder 53h where the data is convolutionally encoded and subsequently block interleaved to combat fast fades. The resulting data stream is modulo two added to the synchronous Walsh code and QPSK or BPSK spread across the CDMA RF channel bandwidth.

The Paging channel is applied to a convolutional encoder 53i where it is convolutionally encoded and is then block interleaved. The resulting data stream is combined with the output of a long code generator 53j. The long PN code is used to separate different user terminal 13 bands. The paging channel and the long code are modulo two added and provided to a symbol cover where the resulting signal is modulo two added to the Walsh Code. The result is then QPSK or BPSK spread across the CDMA FD RF channel bandwidth.

In general, the paging channel conveys several message types which include: (a) a system parameter message; (b) an access parameter message; and (c) a CDMA channel list message.

The system parameter message includes the configuration of the paging channel, registration parameters, and parameters to aid in acquisition. The access parameters message includes the configuration of the access channel and the access channel data rate. The CDMA channel list message conveys, if used, an associated pilot identification and Walsh code assignment.

The vocoder 53k encodes the voice into a PCM forward traffic data stream. The forward traffic data stream is applied to a convolutional encoder 53l where it is convolutionally encoded and then block interleaved in block 53f. The resulting data stream is combined with the output of a user long code block 53k. The user long code is employed to separate different subscriber channels. The resulting data stream is then power controlled in multiplexer (MUX) 53m, modulo two added to the Walsh code, and then QPSK or BPSK spread across the CDMA RF communication channel bandwidth.

The gateway 18 operates to demodulate the CDMA return link(s). There are two different codes for the return link: (a) the zero offset code; and (b) the long code. These are used by the two different types of return link CDMA Channels, namely the access channel and the return traffic channel.

For the access channel the gateway 18 receives and decodes a burst on the access channel that requests access. The access channel message is embodied in a long preamble followed by a relatively small amount of data. The preamble is the user terminal's long PN code. Each user terminal 13 has a unique long PN code generated by a unique time offset into the common PN generator polynomial.

After receiving the access request, the gateway 18 sends a message on the forward link paging channel (blocks 53e, 53i, 53j) acknowledging receipt of the access request and assigning a Walsh code to the user terminal 13 to establish a traffic channel. The gateway 18 also assigns a frequency channel to the user terminal 13. Both the user terminal 13 and the gateway 18 switch to the assigned channel element and begin duplex communications using the assigned Walsh (spreading) code(s).

The return traffic channel is generated in the user terminal 13 by convolutionally encoding the digital data from the local data source or the user terminal vocoder. The data is then block interleaved at predetermined intervals and is applied to a 128-Ary modulator and a data burst randomizer to reduce clashing. The data is then added to the zero offset PN code and transmitted through one or more of the satellites 12 to the gateway 18.

The gateway 18 processes the return link by using, by example, a Fast Hadamard Transform (FHT) to demodulate the 128-Ary Walsh Code and provide the demodulated information to the diversity combiner.

The foregoing has been a description of a presently preferred embodiment of the communication system 10. A description is now made of presently preferred embodiments of the present invention.

It is first noted that one possible technique for billing a service provider for a given user connection or call is to bill a flat rate based on a duration of the connection. The flat rate can be referred to as a Voice Equivalent Minute (VEM), which is predetermined to account for an amount of system resources consumed by a user terminal per minute of connection time. The VEM may be based on some typical voice quality which, in turn, is representative of some 'typical' vocoder rate (perceived speech quality), forward link power, diversity level, etc.

While the VEM is a relatively simple technique for accounting for the use of a satellite communication system, it fails to take into consideration a number of situations that can result in underbilling the service provider. For example, a user who is uploading a large data file at 9600 baud will consume more satellite prime power than a user involved in a typical telephone conversation which takes place at an average vocoder rate of, by example, 2400 baud. Also by example, a user who is making a call from within a vehicle with a handheld terminal will consume more satellite power than another user who makes a same duration call while standing in the open away from any RF obstructions.

Figure 6:
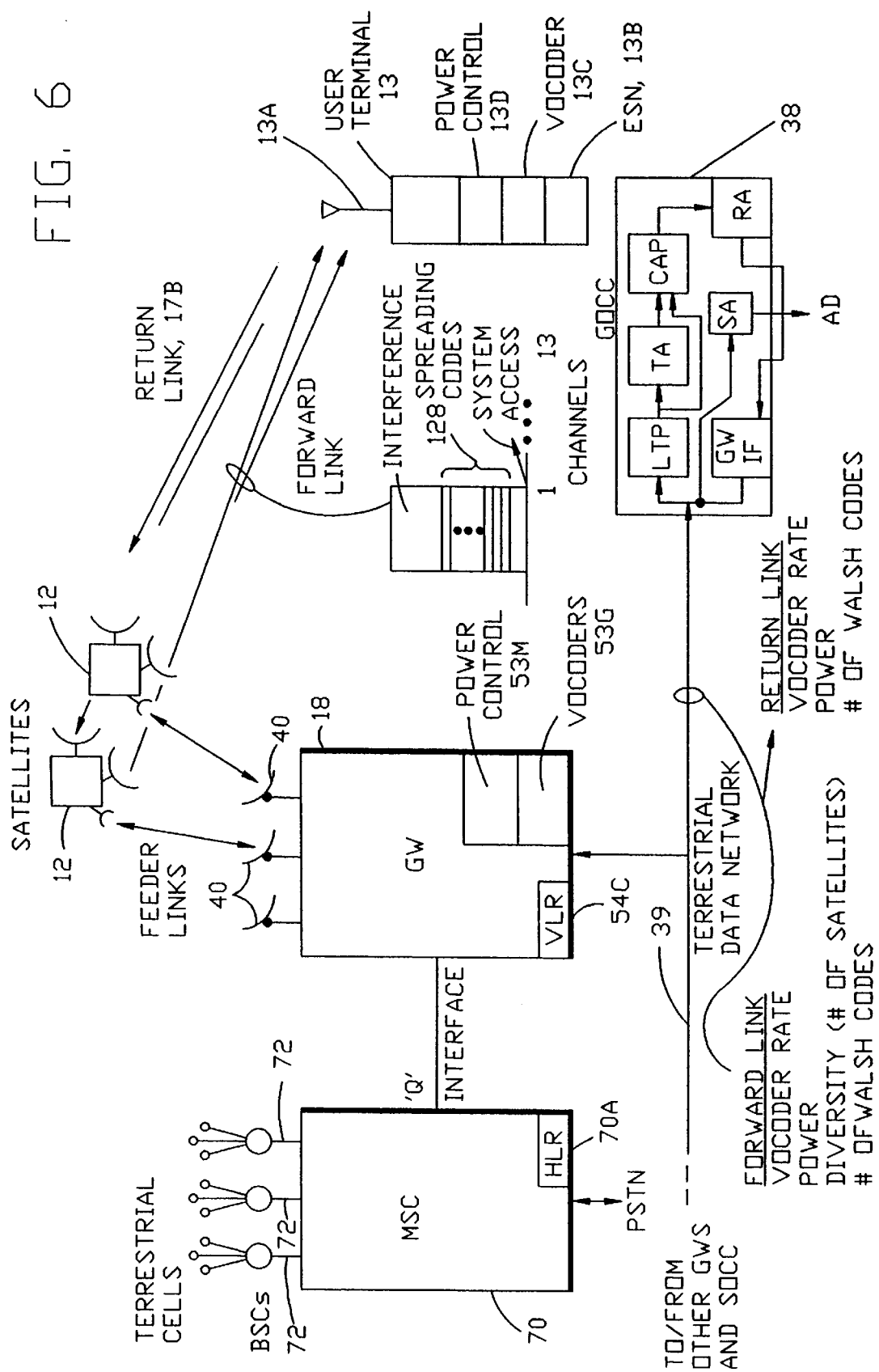
FIG. 6 is a block diagram of the satellite communication system showing the teaching of this invention in greater detail.

Reference is now made to FIG. 6 for illustrating a simplified block diagram of the satellite communications system 10 of FIG. 1. The user terminal 13 can be a handheld, vehicle mounted, or fixed terminal. The user terminal 13 includes an Electronic Serial Number (ESN) 13B, that uniquely identifies the terminal, and may further identify the terminal type (e.g., vehicle, fixed, handheld, voice only, voice/data, data, etc.). The user terminal 13 typically includes a variable rate (1200, 2400, 4800, 9600 baud) vocoder 13c for digitizing a user's speech and for converting input vocoded speech to an analog format. The user terminal 13 also includes a closed loop transmitter power control function 13d that may be similar to that specified in the before-mentioned TIA/EIA Interim Standard, "Mobile Station-Base Station Compatibility Standard for Dual-Mode Wideband Spread Spectrum Cellular System" TIA/EIA/IS-95, July 1993. The antenna 13a connects the user terminal 13 to one or more of the low earth orbit (LEO) satellites 12.

As was previously described in reference to FIG. 3A, in this embodiment of the invention the satellites 12 are bent pipe repeaters that receive user transmissions from one of 16 beams on the return link 17b, frequency translate same, and transmit the user signal to a GW 18 on link 19b. The satellites 12 also receive a feeder link 19a from the GW, frequency translate same, and transmit a signal to the user terminal through the same one of the 16 beams on the forward link 17a. The bit rate of the forward link signal is directly proportional to the amount of satellite power required to transmit the signal. Also, in that the satellites 12 use linear amplifiers, the transmitted satellite power for a given beam is directly proportional to the number of users being serviced by the beam.

On each of the forward and return links 13 different frequency channels are defined, with transmissions in each channel being accomplished with the direct spread (DS), code division multiple access (CDMA) technique. By example, 128 different Walsh spreading codes are defined per channel, thus enabling a number of users (e.g., 50) to simultaneously use the same channel frequency. During call set-up the user terminal 13 is assigned at least one Walsh code for the forward link and at least one Walsh code for the return link. As such, the Walsh codes are also a consumable system resource, in that if all available Walsh codes for a given channel are assigned the communications traffic capacity of that channel is fully utilized.

The GW 18 is responsible for assigning channels and Walsh codes to user terminals and for controlling the power of the user terminals during a call. The power is controlled by sensing the user terminal's signal quality on the return link and by adjusting the transmitter power of the user terminal 13 with power control bits sent by the GW 18 over the forward link. Based on the GW signal quality received at the user terminal 13, the user terminal is also adapted to control the GW transmitted power on the forward link. That is, if the GW signal quality is low, as received at the user terminal 13, the user terminal 13 will send power control bits over the return link to the GW 18 to increase the GW transmitter power. Signal quality can be determined from, by example, the energy per bit or from the frame error rate.

As was previously described, the GW 18 is also capable of transmitting to a user terminal 13 through more than one satellite via its multiple directional antennas 40. This results in identical copies of the same signal being received at the user terminal 13. These copies are coherently combined in the user terminal 13, as described in U.S. Pat. No. 5,233,626 (Ames), resulting in an increased immunity to fading.

The GW 18 has a connection to the Public Switched Telephone Network (PSTN), and includes the above-described variable rate vocoders 53g for digitizing input speech before transmitting same over the forward link to the user terminal 13. A connection to a Mobile Switching Center (MSC) 70 is also typically provided. The MSC is a conventional system having a Home Location Register (HLR) 70a, and may have one or more Base Station Controllers (BSCs) 72 connected thereto, each BSC 72 handling terrestrial wireless cells.

In accordance with this invention the GW 18 accumulates data concerning each call or connection made by individual user terminals. This data results from periodic measurements that are made at, by example, the frame rate (20 msec) or at some multiple of the frame rate. At the termination of the call the data is preprocessed by the GW 18. For example, the collected data is averaged over 100 msec or greater intervals and is stored in the GW 18 for subsequent delivery over the TDN 39 to the GOCC 38. The GOCC 38 uses this data for at least two purposes.

One use of the data is to derive statistics describing the historical use of the system 10. That is, Long Term Planning (LTP) and Trend Analysis (TA) modules operate on the data. The outputs of the LTP and TA are fed to a Capacity Planning (CAP) module which predicts future demand on the system based on the historical demand. The output of the CAP is fed to a Resource Allocation (RA) module which assigns channels, maximum transmitter power levels, etc. to individual ones of the GWs 18 via a GW Interface (IF) using the TDN 39. This allocation is preferably made in part also on inputs from the Satellite Operations Control Center (SOCC) 36. As was previously described, the SOCC 36 is responsible for monitoring the battery charging state, transponder status and operability, and all other aspects of satellite operation. The end result is the outputting of data to control the GWs 18 so as to proportionately allocate and balance the use of the overall system and satellite resources, and also to monitor the quality of service provided to users.

A second use of the data output from the GW 18 is the determination of an amount of total system resources that were allocated to and consumed by the user terminal 13 during a call or connection. To this end the GOCC 38 also includes a Service Accounting (SA) module that receives the system usage data that is output from the GW 18, along with an identification of the user terminal 13 and the total connection time. The SA module processes the system usage data in accordance with predetermined criteria and outputs Accounting Data (AD) for use in billing the service provider associated with the GW 18.

The data that is accumulated by the GW 18, in particular the gateway controller 56, during a connection for outputting to the GOCC can include all of or a portion of the following.

| FORWARD LINK | RETURN LINK |
| --- | --- |
| GW vocoder rate | UT vocoder rate |
| GW XMTR power | UT XMTR power |
| # of Walsh codes | # of Walsh Codes |

It is also within the scope of this invention for the GW-accumulated data to include one or more of the following: Diversity Level (i.e. # of satellites), Terminal Type, and Terminal Location.

The vocoder rate of the user terminal 13 is known on a per frame basis, as the GW 18 must determine same in order to properly decode the user terminal transmission. The transmitter power level of the user terminal 13 is also known to the GW 18, as the GW is continuously controlling the user terminal power level up and down at the frame rate. An initial user terminal power level is known to the GW 18 at the time the connection is first set up, and subsequent user terminal power adjustments are preferably then made from the initial level. The number of Walsh codes in use are of course known to the GW 18, as they are assigned by the GW.

The diversity level on the return link can be determined by the GW 18 from the location of the user terminal 13, which is determined from satellite positioning data when the connection is established, and from satellite ephemeris data that is stored in the GW 18. That is, by knowing the location of the user terminal 13 and the number and locations of the satellites 12 that can be reached from the user terminal's antenna 13a, the GW 18 can determine how many satellites are being used to relay the return communication link from the user terminal 13 to the GW 13.

The user terminal location data gives the latitude of the user terminal 13, which is useful if latitude-dependent components of system power usage are determined. The user location can also be useful in determining which user terminals are in peripheral regions of a satellite's beam pattern, where greater power is required.

The user terminal type can be employed to distinguish, by example, hand-held terminals from typically higher-powered vehicle-mounted terminals.

The SA operates on the data provided by the GW 18 to determine, by example, a monetary amount that corresponds to the total amount of the system capacity and satellite power that were consumed by the user terminal during the connection.

It is also within the scope of the invention to employ the system usage data to derive a correction or weighting factor to be used in adjusting a predetermined VEM to more accurately reflect the actual system usage for a given call or connection.

While the invention has been particularly shown and described with respect to a preferred embodiment thereof, it will be understood by those skilled in the art that changes in form and details may be made therein without departing from the scope and spirit of the invention. By example, although vocoder rate and frames have been described above, it is within the scope of this invention to also employ a data coder rate and frame time, or some other temporal communication increment. It is also within the scope of this invention to employ other than a low earth orbit constellation of satellites, such as one or more mid-earth orbit satellites (e.g., satellites that orbit at approximately 10,000 km to 19,000 km). It is also within the scope of this invention to employ satellites that perform on-board processing of communications traffic, with or without satellite cross-links, as opposed to relatively simpler bent pipe repeater satellites. The teaching of this invention may also be employed to advantage in satellite communications systems that use other than spread spectrum modulation techniques and/or code division, multiple access techniques. By example, the teaching of this invention can be used with satellite communications systems that employ time division/multiple access (TDMA) techniques.

What is claimed is:

1. A method for operating a satellite communications system, comprising the steps of:

establishing a wireless connection with a user terminal from a gateway that is coupled to the user terminal through at least one satellite via a forward link and a return link;

during the connection, determining and storing system usage data in the gateway expressive at least of a type of connection made by the user terminal, an indication of an amount of power expended by the at least one satellite to maintain the wireless connection, and a duration of the connection; and after a termination of the wireless connection, accumulating system usage data and outputting the system usage data from the gateway to a system resource allocation and billing center for use in billing a service provider associated with the gateway.

2. A method as set forth in claim 1, wherein the step of determining and storing an indication of an amount of power includes a step of:

determining an amount of forward link power being used to maintain the wireless connection.

3. A method as set forth in claim 1, wherein the step of determining and storing an indication of an amount of power includes a step of:

determining an amount of return link power being used to maintain the wireless connection.

4. A method as set forth in claim 1, wherein the step of determining and storing includes a step of:

determining a gateway data transmission rate.

5. A method as set forth in claim 1, wherein the step of determining and storing includes a step of:

determining a user terminal data transmission rate.

6. A method as set forth in claim 1, wherein the step of determining and storing includes a step of:

determining a number of satellites through which the wireless connection is being maintained.

7. A method as set forth in claim 1, wherein the step of determining and storing includes a step of:

determining a number of spreading codes that are in use on the forward link.

8. A method as set forth in claim 1, wherein the step of determining and storing includes a step of:

determining a number of spreading codes that are in use on the reverse link.

9. A method as set forth in claim 1, and including a step of determining and storing a location of the user terminal.

10. A method as set forth in claim 1, wherein the gateway includes a vocoder for processing speech at a predetermined frame rate, and wherein the step of determining and storing is performed periodically at the frame rate or a multiple of the frame rate.

11. A method as set forth in claim 1, and further comprising the steps of:

processing at the system resource allocation and billing center the system usage data from a plurality of gateways to derive a historical record of the satellite system usage;

employing the historical record to predict a future system usage; and allocating satellite system resources amongst the plurality of gateways in accordance with the predicted future system usage.

12. A satellite communications system having at least one user terminal adapted for bidirectional wireless communication with a gateway through at least one satellite, comprising:

an RF system in said gateway for establishing a wireless connection with a user terminal through at least one satellite via a forward link and a return link;

a data processor system in said gateway for determining and storing system usage data expressive at least of a type of connection made by the user terminal, an indication of an amount of power expended by the at least one satellite to maintain the wireless connection, and a duration of the connection; and an interface in said gateway for outputting the stored system usage data to a system resource allocation and billing center for use in billing a service provider associated with the gateway.

13. A system as set forth in claim 12, wherein said data processor system determines and stores at least one of an amount of forward link power and an amount of reverse link power used to maintain the wireless connection.

14. A system as set forth in claim 12, wherein said data processor system further determines and stores at least one of a forward link transmission rate and a reverse link transmission rate.

15. A system as set forth in claim 12, wherein said data processor system further determines and stores a number of satellites through which the wireless connection is maintained.

16. A system as set forth in claim 12, wherein user terminal and gateway wireless communications are modulated with spreading codes, and wherein said data processor system further determines and stores at least one of a number of spreading codes that are in use on the forward link and a number of spreading codes that are in use on the reverse link between said user terminal and said gateway.

17. A system as set forth in claim 12, wherein said data processor system further determines and stores a location of the user terminal.

18. A system as set forth in claim 12, wherein the gateway includes at least one of a voice coder and a data coder operating at a predetermined frame rate, and wherein said data processor system determines the system usage data at the frame rate or a multiple of the frame rate.

19. A system as set forth in claim 12, wherein said system resource allocation and billing center includes a data processor for processing the system usage data to derive a historical record of the satellite system usage, for employing the historical record to predict a future system usage, and for allocating satellite system resources to said gateway in accordance with the predicted future system usage.

20. A satellite communication system, comprising:
a constellation of earth orbiting satellites;
at least one terrestrially located user terminal;
at least one terrestrially located gateway, said gateway comprising a RF transceiver system for establishing a bidirectional spread spectrum, power controlled wireless communication connection between a terrestrial communications system and said at least one user terminal through at least one of said satellites;
at least one terrestrially located control center; and
a terrestrially located data network coupling said at least one gateway to said at least one control center;
wherein, said at least one gateway comprises a data processor system for periodically recording system usage data during a wireless bidirectional communication connection with a user terminal, said system usage data being expressive at least of a type of connection made by the user terminal, an indication of an amount of power expended by said satellite constellation to maintain the wireless connection, and a duration of the connection, and wherein said gateway further comprises an interface for outputting said recorded system usage data to said data network for reception by said control center for use in billing a service provider associated with the gateway.

21. A system as set forth in claim 20, wherein said indication of an amount of power is further expressive of an amount of forward link power and an amount of reverse link power used to maintain the wireless bidirectional communication connection, and said recorded system usage data is also expressive of at least one of a forward link transmission rate and a reverse link transmission rate.

22. A system as set forth in claim 20, wherein said recorded system usage data is further expressive of a number of satellites through which the wireless bidirectional communication connection is maintained.

23. A system as set forth in claim 20, wherein said recorded system usage data is further expressive of a number of spreading codes that are in use on a forward link and a number of spreading codes that are in use on a reverse link.

24. A system as set forth in claim 20, wherein the gateway includes at least one of a voice coder and a data coder operating at a predetermined frame rate, and wherein the system usage data is recorded at the frame rate or a multiple of the frame rate.

25. A system as set forth in claim 20, wherein said control center includes a data processor for processing the system usage data to derive a historical record of the system usage, for employing the historical record to predict a future system usage, and for allocating satellite system resources to said at least one gateway in accordance with the predicted future system usage.

26. A system as set forth in claim 20, wherein said constellation of earth orbiting satellites comprise a constellation of low earth orbiting satellites.

27. A system as set forth in claim 20, wherein said constellation of earth orbiting satellites comprise a plurality of satellites distributed in n orbital planes with m equally-spaced satellites per plane.

28. A system as set forth in claim 27, wherein n is equal to eight and wherein m is equal to six.

29. A system as set forth in claim 27, wherein the orbital planes are inclined at approximately 52 degrees with respect to the equator, and wherein each satellite completes an orbit in approximately 114 minutes.

30. A system as set forth in claim 20, wherein said recorded data is employed to modify a predetermined connection rate.

31. A satellite communication system, comprising:
a constellation of earth orbiting satellites;
a plurality of terrestrially located user terminals;
a plurality of terrestrially located gateways including transceivers for establishing a bidirectional wireless digital communication connection between a terrestrial communications system and at least one of said user terminals through at least one of said satellites;
at least one terrestrially located control center; and
a terrestrially located data network coupling said plurality of gateways to said at least one control center;
wherein, said gateways include a data processor system and memory for storing data during a wireless bidirectional digital communication connection with said user terminals, said stored data being expressive at least of an identity of the user terminals, types of user terminals, types of connections made by the user terminals, an indication of an amount of power expended by said satellite constellation to maintain each wireless connection, and a duration of each connection, and wherein said gateways each include data transmission circuitry for outputting said stored data to said data network for reception by said control center;
and wherein, said control center processes the system usage data received from said plurality of gateways to predictively allocate satellite system resources amongst said plurality of gateways and to derive billing information from the system usage data for use in billing a service provider associated with the gateway.

32. A method for operating a satellite communications system, comprising the steps of:
establishing a wireless connection with a user terminal from a gateway that is coupled to the user terminal through at least one satellite via a forward link and a return link;
during the connection, repetitively determining at the gateway an amount of satellite system resources that are being used to maintain the wireless connection with the user terminal; and
after a termination of the wireless connection, outputting the system usage data from the gateway, the system usage data indicating at least an amount of satellite system resources that were required to provide the wireless connection with the user terminal, the system usage data comprising an indication of an amount of power expended by said at least one satellite to maintain the wireless connection, and being used at least in part for billing a service provider associated with the gateway.

33. A satellite communications system having at least one user terminal adapted for bidirectional wireless communication with a gateway through at least one satellite, comprising:

means in said gateway for establishing a wireless connection with a user terminal through at least one satellite via a forward link and a return link;

means in said gateway for determining, during the wireless connection, an amount of satellite system resources that are in use for maintaining the wireless connection with the user terminal; and means in said gateway, responsive to a termination of the wireless connection, for outputting the system usage data that indicates an amount of satellite system resources that were required to provide the wireless connection with the user terminal, the system usage data comprising an indication of an amount of power expended by said at least one satellite to maintain the wireless connection, and being used at least in part for billing a service provider associated with the gateway.

34. A satellite communication system, comprising:

a constellation of earth orbiting satellites;

at least one terrestrially located user terminal;

at least one terrestrially located gateway, said gateway including means for establishing a bidirectional spread spectrum, power controlled wireless communication connection between a terrestrial communications system and said at least one user terminal through at least one of said satellites;

at least one terrestrially located control center; and a terrestrially located data network coupling said at least one gateway to said at least one control center;

wherein, said at least one gateway includes means for periodically recording data during a wireless bidirectional communication connection with a user terminal, said data being expressive at least of an identity of the user terminal and an amount of satellite communication system resources that are consumed in order to provide the wireless bidirectional communication connection, and wherein said gateway includes means for outputting said recorded system usage data to said data network for reception by said control center, said recorded system usage data comprising an indication of an amount of power expended by said satellite constellation to maintain the wireless connection, and being used at least in part for billing a service provider associated with the gateway.

35. A method for operating a satellite communications system, comprising the steps of:

establishing a wireless connection with a user terminal from a gateway that is coupled to the user terminal through at least one satellite via a forward link and a return link;

during the connection, determining and storing system usage data in the gateway expressive at least of an identity of the user terminal, the type of user terminal, an indication of an amount of power expended by the at least one satellite to maintain the wireless connection through the forward link and the reverse link, and a duration of the connection; and after a termination of the wireless connection, outputting the system usage data from the gateway to a system resource allocation and billing center, the system usage data being used at least in part for billing a service provider associated with the gateway.

36. A method for operating a satellite communications system, comprising the steps of:

establishing a wireless connection with a user terminal from a gateway that is coupled to the user terminal through at least one satellite via a forward link and a return link;

during the connection, determining and storing system usage data in the gateway expressive at least of an identity of the user terminal, the type of connection made by the user terminal, an indication of an amount of power expended by the at least one satellite to maintain the wireless connection through the forward link and the reverse link, and a duration of the connection; and after a termination of the wireless connection, outputting the system usage data from the gateway to a system resource allocation and billing center, the system usage data being used at least in part for billing a service provider associated with the gateway.

37. A method for operating a satellite communications system, comprising the steps of:

establishing a wireless connection with a user terminal from a gateway that is coupled to the user terminal through at least one satellite via a forward link and a return link;

during the connection, determining and storing data in the gateway that is expressive at least in part of an amount of satellite communication system resources that are used in maintaining the connection; and after a termination of the wireless connection, outputting the system usage data from the gateway to a system resource allocation and billing center, wherein the system usage data is employed at least in part to modify a predetermined connection rate.

38. A method for operating a satellite communications system, comprising the steps of:

establishing a wireless connection with a user terminal from a gateway that is coupled to the user terminal through at least one satellite via a forward link and a return link;

during the connection, determining and storing system usage data in the gateway expressive at least of an identity of the user terminal, the type of connection made by the user terminal, and a duration of the connection; and after a termination of the wireless connection, outputting the system usage data from the gateway to a system resource allocation and billing center.

* * * * *